June 3, 1969   G. M. SNYDER   3,447,270
PRECISION PRODUCTION GRINDER
Filed Dec. 27, 1966   Sheet 1 of 2
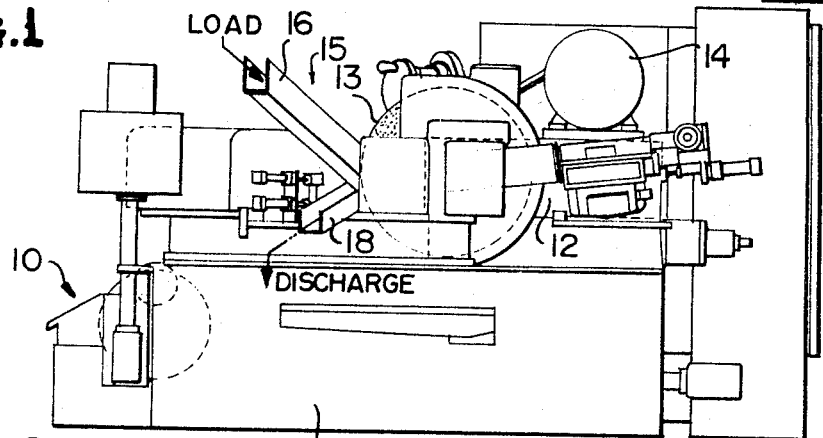
Fig.1
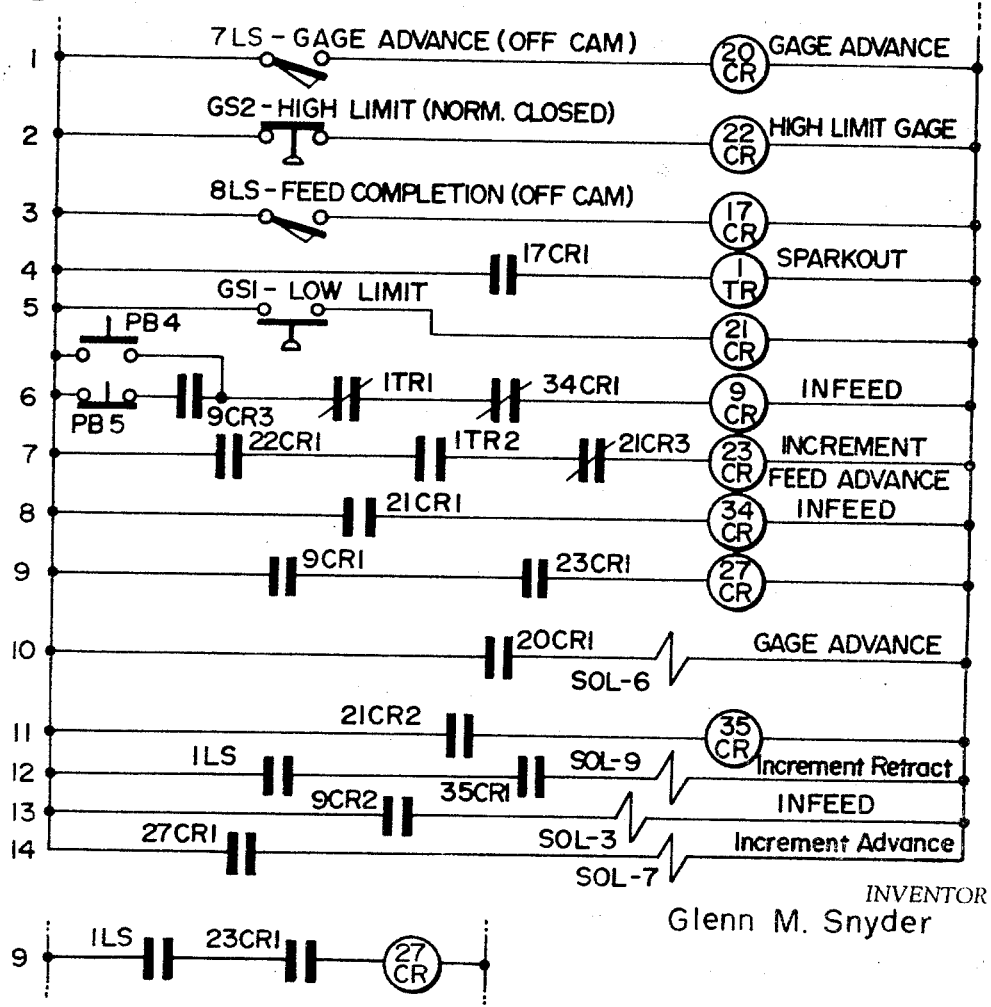
Fig.2
Fig.2A
INVENTOR
Glenn M. Snyder
BY Mason, Porter, Diller & Brown
ATTORNEYS

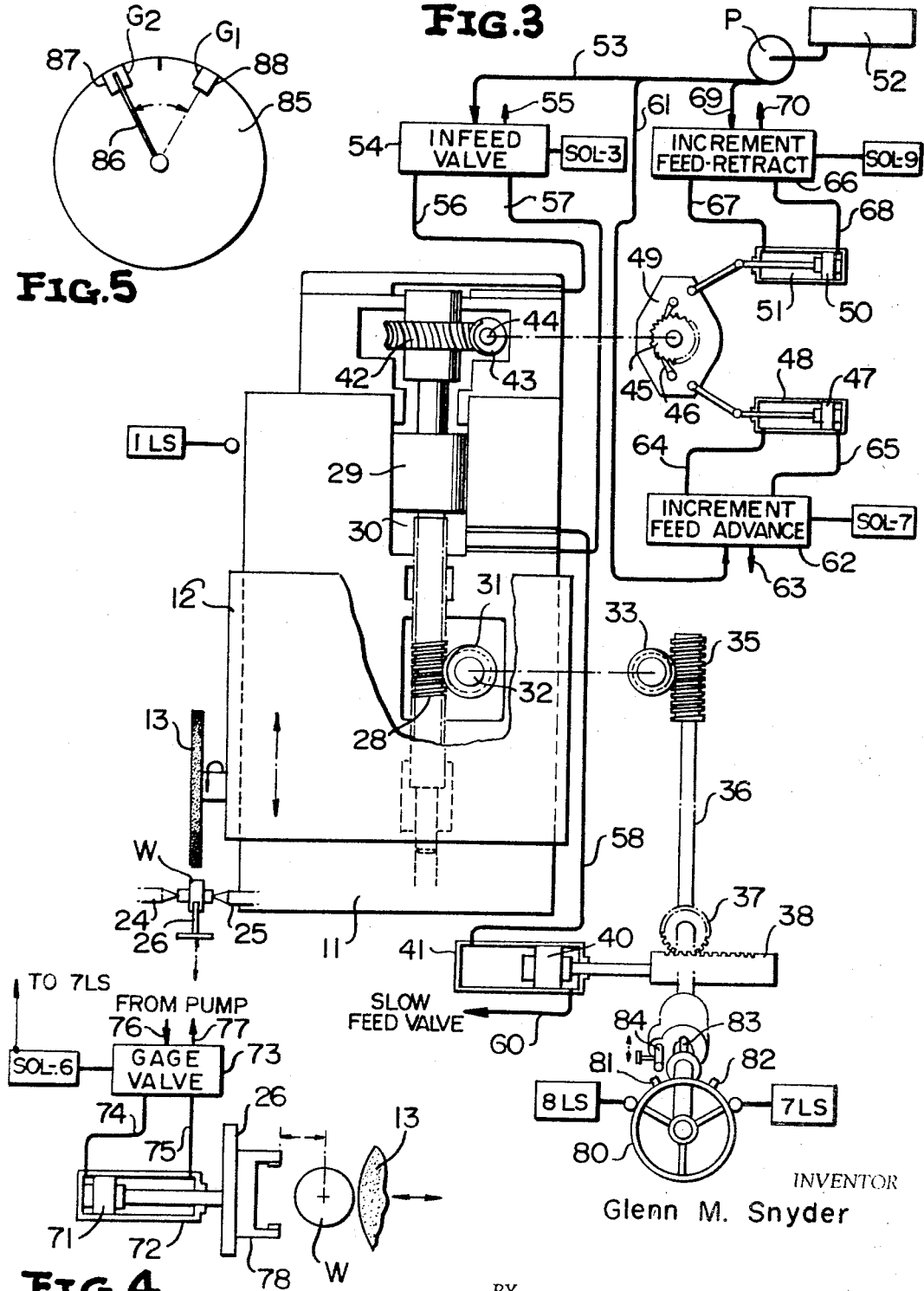
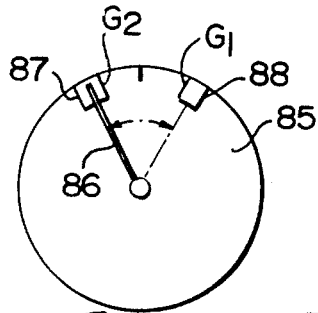

United States Patent Office 3,447,270
Patented June 3, 1969

3,447,270
PRECISION PRODUCTION GRINDER
Glenn M. Snyder, Waynesboro, Pa., assignor to Landis Tool Company, Waynesboro, Pa., a corporation of Pennsylvania
Filed Dec. 27, 1966, Ser. No. 605,038
Int. Cl. B24b 49/04
U.S. Cl. 51—165                                    6 Claims

ABSTRACT OF THE DISCLOSURE

This subject has to do with a precision production grinder wherein the workpieces are gauged beginning at a point prior to the sparkout of the grinding operation and wherein when the dimension of a gauged to workpiece approaches the tolerance limits, the advance of the grinding wheel support is automatically adjusted to assure that the next ground workpiece is within the tolerance limits. This subject particularly has to do with the provision of a gauge which is applied to the workpiece during the grinding thereof and wherein the gauge is coupled to control means for automatically actuating the conventional increment feed of the wheel support. Another feature is that when the gauge determines that a workpiece is approaching the undersize limit thereof during a grinding operation, the wheel support is automatically retracted to prevent further grinding whereby undersize workpieces are eliminated.

---

This invention relates in general to grinding machines, and more particularly to machines for grinding external cylindrical surfaces. The invention more particularly relates to high production machines as distinct from high precision machines. In both types of machines, the work may be supplied to the machine by a loader of the type which requires only a small portion of the grinding cycle to remove a ground workpiece and insert an unground workpiece.

In high precision machines, the grinding operation is terminated by a sizing device. In high production machines, the grinding operation is usually terminated by a positive stop in the path of the grinding wheel support or some other portion of the feed mechanism and a sparkout time.

In high production machines, the grinding feed is rapid, the rate of stock removal is high, wheel wear is high and the tolerance is relatively large. Because of the rapid wheel wear, an operator must be present to adjust the feed mechanism from time to time to compensate for wheel wear. Correction is needed not only for wheel wear, but also for change in the position of the grinding wheel and work due to thermal changes in the machine.

In a machine controlled by a gauge or sizing device, there is no problem of wheel wear, since the grinding operation continues until stopped by the gauge. However, this type of operation requires a longer grinding time per workpiece because of the slower rate of stock removal and the slow finish feed necessary to produce the fine finish and high degree of precision. Because there is no need to compensate for wheel wear, the high precision machines do not require constant attention and one operator can take care of two or more machines.

It is, therefore, an object of the present invention to provide high production machines which will function automatically so that one operator can attend two or more machines.

Another object of this invention is to provide a high production machine with improved precision.

Still another object of this invention is to provide a high production machine with automatic means for compensating for wheel wear and the other variables.

Another object of this invention is to provide a high production machine in which a gauge is applied to the work during the sparkout operation and if the work is off-size by a predetermined amount within the upper and lower tolerances, the feed machinism is adjusted to correct for the amount of off-size.

The preferred form of the invention is disclosed in a machine set up for a plunge cut grinding operation. The grinding feed may be effected by a feed mechanism of the type disclosed in U.S. Patent 3,046,706, granted July 31, 1962, and 3,047,988, granted Aug. 7, 1962, in which the wheel support and grinding wheel are advanced rapidly to place the grinding wheel in operative relation to a workpiece, then at a slower rate for a relatively rapid grinding operation, at the end of which a positive stop prevents further advance of the grinding wheel, and the grinding operation is continued by sparkout. During the sparkout operation, a gauge is applied to the workpiece. If the workpiece is ground within the specified limits determined by the high and low gauge points, it will be within the high and low tolerance limits. The next grinding operation occurs with no change in the feed mechanism. If, at the end of the timed sparkout period, the work is approaching the oversize tolerance limit, a gauge signal will be given to close the contact in the circuit to actuate the feed increment mechanism. However, the circuit is not completed and the increment mechanism does not function until the grinding wheel has at least been retracted to its back position, at which time, the circuit is completed and the rapid feed control mechanism is actuated to a point beyond its previous point of advance by the amount of one increment and the approximate amount of oversize of the previous work. If at any time during the sparkout operation, the work size approaches the low limit, the gauge will provide a signal which will effect the immediate retraction of the grinding wheel and stop the grinding operation without waiting for the sparkout timer to time out. At the same time, the gauge will signal to reset the feed mechanism by one increment. Increment is provided when the wheel is retracted. This increment is greater than increment correction for an oversize signal so that the grinding wheel is quickly retracted from a near undersize position.

With the above and other objects in view that will hereintfter appear, the nature of the invention will be more clearly understood by reference to the following detailed description, the appended claims and the several views illustrated in the accompanying drawings.

In the drawings:

FIGURE 1 is a front elevational view of a grinding machine in accordance with this invention.

FIGURE 2 is a wiring schematic of the controls for the grinding machine in accordance with this invention.

FIGURE 2A is a fragmentary wiring schematic showing a modification of the schematic of FIGURE 2.

FIGURE 3 is a schematic view showing the specific feed controls for the grinding machine.

FIGURE 4 is a schematic view showing the manner in which the caliper type gauge is applied to a workpiece during a grinding operation.

FIGURE 5 is a diagrammatic view showing the limits of operation of the caliper type gauge.

Referring now to the drawings in detail, it will be seen that there is illustrated in FIGURE 1 a grinding machine formed in accordance with this invention, the grinding machine being generally identified by the numeral 10. In view of the fact that the grinding machine 10 is basically a conventional type of grinding machine, only those components thereof which are required for an understanding of the invention will be described here.

The grinding machine includes a base 11 on which a grinding wheel 12 is slidably mounted. The grinding wheel support 12 carries a rotating grinding wheel 13 which is driven, for example, by means of a motor 14.

Workpieces W to be ground are automatically fed into the grinding machine 10 by means of a loading mechanism which is generally referred to by the numeral 15. The loading mechanism 15 includes a loading chute 16 and a discharge chute 18.

Referring now to FIGURE 3 in particular, it will be seen that a workpiece W properly fed into the machine 10 is supported between centers 24 and 25 for rotation during the grinding operation. It is to be understood, however, that the invention is not restricted to this particular type of workpiece supporting mechanism.

It is to be noted at this time that a gauge 26 is mounted in generally opposed relation to the grinding wheel 13 for engagement with a workpiece W at a predetermined time or point during a grinding operation thereon.

The means for moving the grinding wheel 13 toward and from a workpiece W consists of a feed screw 28 rotatably mounted in the base 11 and having one end mounted in a piston 29. The piston 29 is slidably mounted in a cylinder 30.

The feed screw 28 is in threaded engagement with a pinion or worm wheel 31 carried at the lower end of a vertical shaft 32. The shaft 32 is rotatably mounted within the wheel support 12. The upper end of the shaft 32 has mounted thereon a worm wheel 33 which is in operative engagement with a worm gear 35. The worm gear 35 is carried by a hand wheel shaft 36 on which there is mounted a pinion 37 disposed in operative engagement with a rack 38. The rack 38 is shifted through a limited range by means of a piston 40 which is mounted within a cylinder 41. The piston 40 and the cylinder 41, in conjunction with the rack 38 and the pinion 37 form a slow feed mechanism.

The end of the feed screw 28 extending beyond the piston 29 has a worm wheel 42 slidably keyed thereon. The worm wheel 42 is in operative engagement with a worm 43 which is mounted on a shaft 44. The shaft 44 also carries a ratchet 45 which is actuated in one direction to advance the feed mechanism by means of a pawl 46 which is driven by a piston 47 mounted in a cylinder 48. The ratchet 45 is actuated in the opposite direction by a pawl 49 whcih is driven by a piston 50 mounted in a cylinder 51. The ratchet 45, when driven by the pawl 49, moves the feed mechanism for the grinding wheel support 12 in a direction to retract the same.

*Hydraulic system*

Referring once again to FIGURE 3 in particular, it will be seen that there is schematically illustrated that portion of the hydraulic system of the grinding machine 10 which is particularly involved in conjunction with this invention. The hydraulic system includes the use of reservoir 52 which has a pump P connected thereto. A fluid line 53 extends from the pump P to an infeed valve 54 which has the position thereof controlled by means of a solenoid SOL-3. The infeed valve 54 will be provided with the usual return line 55 and is connected to the cylinder 30 by means of fluid lines 56 and 57 for effecting the movement of the piston 29.

One end of the cylinder 41 is connected to one end of the cylinder 30 by means of a fluid line 58. A second fluid line 60 extends from the cylinder 41 to a slow feed valve (not shown) which, in turn, will be connected to the pump P in the normal manner and will be suitably operated.

A fluid line 61 extends from the pump P to the increment feed advance vavle 62, the operation of which is controlled by means of solenoid SOL-7. The valve 62 will, of course, be connected to the reservoir 52 by means of a return line 63. Fluid lines 64 and 65 extend from the increment feed advance valve 62 to the cylinder 48 for controlling the position and movement of the piston 47.

The position and movement of the piston 50 within the cylinder 51 is controlled by means of an increment feed retract valve 66 which is connected to the cylinder 51 by means of fluid lines 67 and 68. The valve 66 has the operation thereof controlled by means of a solenoid SOL-9 and is connected to the pump P by means of a fluid line 69. A return line 70 is also connected to the valve 66.

Referring now to FIGURE 4 in particular, it will be seen that the position of the gauge 26 relative to a workpiece W is controlled by means of a piston 71 which is mounted within a cylinder 72. The cylinder 72 is connected to a gauge valve 73 by means of fluid lines 74 and 75. The position of the gauge valve 73 is controlled by means of a solenoid SOL-6. The gauge valve 73 is connected to the pump P by means of a fluid line 76. A return line 77 is also connected to the gauge valve 73. At this time it is also pointed out that the gauge 26 includes a caliper 78 which is particularly calibrated for use in conjunction with a workpiece W of a predetermined diameter.

Returning to FIGURE 3, it to be noted that the hand wheel shaft 36 carries a hand wheel 80. The hand wheel 80 has mounted thereon a pair of cams 81 and 82 which are mounted on axially adjacent rings and angularly positioned for actuating limit switches 8LS and 7LS, respectively. The rotation of the hand wheel 80 is also limited by means of a stop pin 83 which is engageable with a pin 84 which is stationary. Limit switch 8LS is actuated slightly before or at the time that stop pin 83 engages stationary pin 84. The pin 84 is movable axially of the hand wheel shaft 36 so as to release the hand wheel shaft for further rotation should it be desired. Hand wheel 80 and feed piston 40 are shown in the retracted position.

Referring now to FIGURE 5 in particular, it will be seen that there is illustrated diagrammatically a gauge arrangement which illustrates the operation of the gauge 26. Assuming that the gauge 26 operates a visual indicator including a dial 85 and a pointer 86, it will be seen that for a particular workpiece, the tolerance limits would be at 87 and 88. In other words, if the pointer 86 should go in a clockwise direction beyond the limit 88, the workpiece would be too small and have to be rejected. Accordingly, it is desired to limit the low side of the workpiece size at a point G1 on the dial 85. In a like manner, should the pointer 86 move in a counterclockwise direction beyond the limit 87, the workpiece would be oversize and have to be reground. Therefore, it is desired to reset the position of the grinding wheel 13 when the size of the workpiece is above the point indicated by the point G2.

*Operation*

Particular reference is now made to the wiring schematic of FIGURE 2. The grinding operation is started by closing push button switch PB4 to complete a circuit through normally closed contact 1TR1 and normally closed contact 34CR1 to energize relay 9CR. This results in the closing of contact 9CR3 and a holding circuit by-passing switch PB4 is completed through push button switch PB5 and contact 9CR3.

When relay 9CR is energized, contact 9CR2 also closes to energize the feed solenoid SOL-3 which effects the shifting of the infeed valve 54 to direct fluid under pressure through the fluid line 56 into the cylinder 30 to effect a shifting of the piston 29 with the resultant shifting of the feed screw 28 and the wheel support 12 to position the grinding wheel 13 adjacent a workpiece W carried by the centers 24 and 25. Thereafter, the fluid under pressure is directed by the slow feed valve (not shown) to the right end of the slow feed cylinder 41 to move the piston 40 and the rack 38 to the left. The shifting of the rack 38 to the left results in the rotation of the pinion 37, the hand wheel 80 and the hand wheel shaft 36.

The worm 35 on the hand wheel shaft 36 rotates in engagement with the worm wheel 33 to turn the shaft 32 and the worm wheel 31, which is in threaded engagement with the feed screw 28, to advance the wheel support 12 and the grinding wheel 13 at a relatively rapid grinding feed rate. As the grinding wheel 13 advances towards the workpiece W in response to the movement of the piston 40 to the left, the cam 82 actuates the gauge limit switch 7LS to close the same and thereby complete the circuit through the relay 20CR. The energization of the relay 20CR results in the closing of the normally open contact 20CR1 to energize the solenoid SOL-6.

The solenoid 6, when energized, shifts the gauge valve 73 to a position wherein it directs fluid under pressure through the fluid line 74 to the left end of the cylinder 72, shifting the piston 71 and the gauge 26 into operative relation with a workpiece W being ground.

The cam 81 on the hand wheel 80 next functions to close the limit switch 8LS at which point the pin 83 engages the pin 84, stopping rotation of the hand wheel 80 and the advance of the grinding wheel 13.

The closing of the limit switch 8LS results in the completion of the circuit to the relay 17CR. When the relay 17CR is energized, the normally open contact 17CR1 closes to complete a circuit to energize the sparkout relay 1TR.

If the workpiece is oversize at the end of the grinding operation, the normally closed gauge switch GS2 will remain closed and the relay 22CR will remain energized with the result that the contact 22CR1 will remain closed in the circuits through the sparkout timer relay contact 1TR2, which is closed at the end of the sparkout, and normally closed contact 21CR3 to hold the relay 23CR energized.

When the infeed relay 9CR is energized to advance the grinding wheel 13 in the next grinding cycle, contact 9CR1 closes in the circuit to the increment feed relay 27CR. This results in the closing of the contact 27CR1 to energize the increment advance solenoid SOL-7. The solenoid SOL-7 shifts the valve 62 to a position directing fluid under pressure through the fluid line 65 to the right end of the cylinder 48 thereby shifting the piston 47 to the left and actuating the pawl 46 to turn the ratchet 45, the shaft 44, the worm 43, the worm wheel 42 and the feed screw 28 one increment to advance the grinding wheel 13 for the next grinding operation to make certain that the next ground workpiece is within the tolerance between the points G1 and G2 on the dial 85 (FIGURE 5).

If the workpiece W has been grounded to the desired size at the end of the sparkout, the gauge switch GS2 will open to open the circuit to the relay 22CR. As a result, contact 22CR1 in the circuit to the relay 23CR will be open and will not be energized upon the closing of the contact 1TR2.

When the relay 9CR is energized to advance the grinding wheel for the next grinding operation, the contact 23CR1 will remain open in the circuit to the increment feed relay 27CR, and the increment feed will not function and the feed setting for the grinding wheel 13 will remain unchanged.

If, at the end of the grinding operation or sparkout, the gauge 26 determines that the size of the workpiece W being ground is below the point G1 on the dial 85, the normally open gauge switch GS1 will close to complete a circuit to energize relay 21CR. The energization of the relay 21CR will result in the closing of the contact 21CR1 to complete the circuit to the relay 34CR. When the relay 34CR is energized, the normally closed contact 34CR1 will open in the circuit to the infeed relay 9CR, opening this circuit immediately without waiting for the sparkout contact 1TR1 to open. When the infeed relay 9CR is de-energized, the infeed mechanism is immediately reversed to cause the grinding wheel to be immedaitely retracted, thereby preventing the further grinding of the workpiece W to a size which could possibly be below the lower tolerance set for the workpiece. In other words, when the gauge 26 determines that a workpiece being ground is beyond the lower limit 88 on the dial 85, the grinding operation which normally occurs during sparkout is prevented, thereby eliminating the possibility that the workpiece could be ground beyond the lower tolerance for the workpiece.

When the relay 21CR is energized due to the gauge indicating that a workpiece is approaching the lower tolerance limit, contact 21CR2 will close to energize the relay 35CR. When the relay 35CR is energized, contact 35CR1 will close in the circuit to the increment retract solenoid SOL-9 which is energized as soon as wheelbase back limit switch 1LS is closed. The switch 1LS is closed when the wheel support 12 reaches its fully retracted position. The solenoid SOL-9, when energized, shifts the increment retract valve 66 to a position wherein fluid under pressure is directed through the fluid line 68 into the cylinder 51, shifting the piston 50 to the left, whereby the pawl 49 rotates the ratchet 45 one increment to retract the grinding wheel 13 one increment of the increment feed mechanism. As indicated above, this undersize increment is greater than the oversize correction increment. This rapid retraction is necessary in order to assure immediate end to the grinding operation. The large increment is necessary in order to be sure that on the next grinding operation, the wheel will be well above the low limit when the positive stop is reached. In this manner, it is assured that the next workpiece ground by the grinding machine 10 will be above the lower tolerance limit 88 on the dial 85 and also above the point G1 on the dial 85.

Reference is now made to FIGURE 2A wherein a modified portion of the wiring schematic is illustrated. It is to be noted that in the circuit to relay 27CR, there has been substituted the limit switch 1LS for the contact 9CR1. This circuitry is utilized when it is desired to effect the increment advance of the grinding wheel at the time the wheel support 12 reaches its back position. It is to be understood that no other change in the wiring circuitry is required to accomplish this change in the timing of the increment advance adjustment of the grinding wheel.

It will be apparent from the foregoing that although the grinding machine 10 is a production machine, the desired precision can be obtained. Furthermore, inasmuch as the machine automatically adjusted to provide for the desired high precision, it will be seen that the machine will not require the constant attention of an operatior and therefore, one operator can attend two or more such machines.

Although only a preferred embodiment of the invention has been specifically illustrated and described herein, it is to be understood that minor variations may be made in the gauging and feed control mechanism without departing from the spirit and scope of the invention, as defined in the appended claims.

I claim:
1. In a grinding machine,
 (a) a work support,
 (b) a grinding wheel support movable transversely toward and from said work support,
 (c) a feed mechanism for effecting transverse movement of said wheel support,
 (d) means for stopping said transverse movement in a position to grind a workpiece to a predetermined size,
 (e) means to effect a precision adjustment of said feed mechanism,
 (f) and control means for controlling the actuation of said means to effect a precision adjustment of said feed mechanism including:
 (g) a gauge member,

(h) means to move said gauge member into contact with a workpiece during a grinding operation, (i) and means coupling said gauge member to said means to effect a precision adjustment of said feed mechanism for actuating the same in accordance with the size of a workpiece being gauged.

2. In the grinding machine of claim 1 together with (a) means operable to immediately retract said wheel support and discontinue the grinding operation when a workpiece being ground is approaching undersize.

3. In the grinding machine of claim 1 together with (a) means operable to immediately retract said wheel support and discontinue the grinding operation when a workpiece being ground is approaching undersize, (b) and said coupling means are operable in response to the retraction of said wheel support to actuate said means to effect a precision adjustment of said feed mechanism in a direction to correct the setting of said feed mechanism in advance of the grinding of the next workpiece.

4. In the grinding machine of claim 1 wherein (a) said control means are operable to actuate said means to effect a precision adjustment of said feed mechanism to advance the setting of said feed mechanism when said wheel support advances for a next grinding operation if the workpiece being ground is approaching oversize at the end of the grinding operation.

5. In the grinding machine of claim 1 wherein (a) said means to move said guage member into engagement with a workpiece has control means operable after the initiation of a grinding operation and prior to the final feeding of the grinding wheel support.

6. In the grinding machine of claim 1 wherein (a) said coupling means includes a switch closed when said wheel support reaches a back position to initiate the actuation of said means to effect a precision adjustment of said feed mechanism when said wheel support is fully retracted.

References Cited

UNITED STATES PATENTS

| | | | |
|---|---|---|---|
| 2,023,777 | 12/1935 | Balsiger | 51—165 |
| 2,049,611 | 8/1936 | Harrison et al. | 51—165 X |
| 2,943,425 | 7/1960 | Balsiger | 51—165 |
| 3,046,706 | 7/1962 | Price | 51—165 |
| 3,047,988 | 8/1962 | Price | 51—165 |
| 3,271,910 | 9/1966 | Haisch | 51—165 |

LESTER M. SWINGLE, *Primary Examiner.*